(12) United States Patent
Coronato et al.

(10) Patent No.: US 10,359,284 B2
(45) Date of Patent: Jul. 23, 2019

(54) YAW RATE GYROSCOPE ROBUST TO LINEAR AND ANGULAR ACCELERATION

(71) Applicant: InvenSense, Inc., San Jose, CA (US)

(72) Inventors: Luca Coronato, Corsico (IT); Giacomo Gafforelli, Casatenovo (IT); Jaakko Ruohio, Milan (IT)

(73) Assignee: InvenSense, Inc., San Jose, CA (US)

( * ) Notice: Subject to any disclaimer, the term of this patent is extended or adjusted under 35 U.S.C. 154(b) by 155 days.

(21) Appl. No.: 15/232,463

(22) Filed: Aug. 9, 2016

(65) Prior Publication Data

US 2017/0234684 A1    Aug. 17, 2017

Related U.S. Application Data

(60) Provisional application No. 62/265,918, filed on Dec. 10, 2015.

(51) Int. Cl.
*G01C 19/5726* (2012.01)
*G01C 19/5747* (2012.01)

(52) U.S. Cl.
CPC ..... *G01C 19/5726* (2013.01); *G01C 19/5747* (2013.01)

(58) Field of Classification Search
None
See application file for complete search history.

(56) References Cited

U.S. PATENT DOCUMENTS

| | | | |
|---|---|---|---|
| 7,421,897 B2 | 9/2008 | Geen et al. | |
| 8,549,919 B2 | 10/2013 | Günthner et al. | |
| 9,452,921 B2 | 9/2016 | Blomqvist et al. | |
| 2011/0061460 A1 | 3/2011 | Seeger et al. | |
| 2011/0154898 A1* | 6/2011 | Cazzaniga | G01C 19/5747 73/504.12 |
| 2011/0303007 A1* | 12/2011 | Rocchi | G01C 19/5712 73/504.09 |
| 2013/0031977 A1* | 2/2013 | Kempe | G01C 19/5747 73/504.04 |
| 2013/0055787 A1 | 3/2013 | Geiger et al. | |
| 2013/0298672 A1 | 11/2013 | Kuhlmann et al. | |
| 2015/0000400 A1 | 1/2015 | Cazzaniga et al. | |
| 2015/0211854 A1* | 7/2015 | Ruohio | G01C 19/5712 73/504.12 |

FOREIGN PATENT DOCUMENTS

EP    2884229 A1    6/2015

* cited by examiner

*Primary Examiner* — Paul M. West
*Assistant Examiner* — Mark A Shabman
(74) *Attorney, Agent, or Firm* — Haley Guiliano LLP; Joshua Van Hoven

(57) ABSTRACT

A gyroscope includes four drive masses and four sense masses. Each drive mass is adjacent to two other drive masses and opposite the fourth drive mass, and each sense mass is adjacent to two other sense masses and opposite the fourth sense mass. Each drive mass may oscillate in a manner that is perpendicular to its adjacent drive mass and parallel and anti-phase to its opposite mass. The sense motion of the each sense mass may be coupled in a manner that prevents motion due to linear acceleration or angular acceleration.

12 Claims, 8 Drawing Sheets

YAW RATE GYROSCOPE ROBUST TO LINEAR AND ANGULAR ACCELERATION

CROSS REFERENCE TO RELATED APPLICATIONS

This application claims the benefits of U.S. Provisional Patent Application No. 62/265,918, filed Dec. 10, 2015, which is hereby incorporated by reference in its entirety.

BACKGROUND

Numerous items such as smart phones, smart watches, tablets, automobiles, aerial drones, appliances, aircraft, exercise aids, and game controllers may utilize motion sensors during their operation. In many applications, various types of motion sensors such as accelerometers and gyroscopes may be analyzed independently or together in order to determine varied information for particular applications. For example, gyroscopes and accelerometers may be used in gaming applications (e.g., smart phones or game controllers) to capture complex movements by a user, drones and other aircraft may determine orientation based on gyroscope measurements (e.g., roll, pitch, and yaw), and vehicles may utilize measurements for determining direction (e.g., for dead reckoning) and safety (e.g., to recognizing skid or roll-over conditions).

Many sensors such as accelerometers, gyroscopes, pressure sensors, and microphones are implemented as microelectromechanical systems (MEMS) sensors. Micromechanical components of the sensor are fashioned using silicon fabrication techniques, and those micromechanical components respond (e.g., move) in response to certain external stimuli that are measured by the sensor, based on the design of the particular micromechanical components. The response of the micromechanical component to the external stimuli may be measured, e.g., by measuring the relative distance between the moving micromechanical components and fixed components of the sensor.

In the case of a MEMS gyroscope, certain micromechanical components are caused to vibrate at a drive frequency. A number of components are often physically connected by numerous springs, each of which is designed to enable motion in certain directions while restricting movement in other directions. When a mass that is vibrating at the drive frequency experiences a Coriolis force along an axis that is perpendicular to the drive axis as a result of rotation, it will move along this Coriolis axis (e.g., a "sense" or "Coriolis" axis) if springs or other structural features do not prevent such a motion. This Coriolis force is proportional to the angular velocity of the rotation. This motion may then be sensed based on the motion of the mass (or in some applications, an additional proof mass connected by the additional springs) in the sense direction, e.g., based on the relative distance between the moving sense mass and fixed components of the gyroscope.

A MEMS gyroscope is implemented in devices that may experience numerous other forces in addition to angular velocity. For example, the gyroscope may also experience forces due to linear acceleration and angular acceleration. These forces may be imparted on the components of the MEMS gyroscope such as the drive and sense masses, resulting in movements that are improperly interpreted as resulting from a Coriolis force or modifying the movement due to the Coriolis force.

SUMMARY OF THE INVENTION

An exemplary gyroscope may comprise four drive masses, wherein each of the four drive masses oscillate in a first plane, wherein a first drive mass is located adjacent to a second drive mass and a fourth drive mass, and opposite a third drive mass, wherein the second drive mass is located adjacent to the first drive mass and the third drive mass, and opposite the fourth drive mass, wherein the third drive mass is located adjacent to the second drive mass and the fourth drive mass, and opposite the first drive mass, and wherein the fourth drive mass is located adjacent to the third drive mass and the first drive mass, and opposite the second drive mass. The gyroscope may also comprise one or more drive electrodes, wherein the one or more drive electrodes cause the first drive mass and the third drive mass to oscillate in parallel and in anti-phase, and wherein the one or more drive electrodes cause the second drive mass and the fourth drive mass to oscillate in parallel and anti-phase, and wherein the oscillations of the first drive mass and the third drive mass are perpendicular to the oscillations of the second drive mass and the fourth drive mass. The gyroscope may also comprise four sense masses, wherein each of the four sense masses is associated with one of the four drive masses, wherein each of the four sense masses moves in a sense axis in response to a Coriolis force caused by the rotation of the gyroscope, and wherein the sense axis for each of the four sense masses is perpendicular to the oscillation of the associated drive mass and the axis of rotation of the gyroscope. The gyroscope may also comprise a plurality of sense coupling links, wherein each of the sense masses is pivotally coupled to two of the other sense masses by one or more of the plurality of sense coupling links.

An exemplary gyroscope may comprise four drive masses, wherein each of the four drive masses oscillate in a first plane, wherein a first drive mass is located adjacent to a second drive mass and a fourth drive mass, and opposite a third drive mass, wherein the second drive mass is located adjacent to the first drive mass and the third drive mass, and opposite the fourth drive mass, wherein the third drive mass is located adjacent to the second drive mass, and the fourth drive mass, and opposite the first drive mass, and wherein the fourth drive mass is located adjacent to the third drive mass and the first drive mass and opposite the second drive mass. The gyroscope may also comprise a plurality of drive coupling links, wherein the plurality of drive coupling links cause the first drive mass and the third drive mass to oscillate in parallel and in anti-phase, and wherein the plurality of drive coupling links cause the second drive mass and the fourth drive mass to oscillate in parallel and anti-phase, and wherein the oscillations of the first drive mass and the third drive mass are perpendicular to the oscillations of the second drive mass and the fourth drive mass. The gyroscope may also comprise four sense masses, wherein each of the four sense masses is associated with one of the four drive masses, wherein each of the four sense masses moves in a sense axis in response to a Coriolis force caused by the rotation of the gyroscope, and wherein the sense axis for each of the four sense masses is perpendicular to the oscillation of the associated drive mass and the axis of rotation of the gyroscope. The gyroscope may also comprise a plurality of sense coupling links, wherein the plurality of sense coupling links cause a first sense mass and a third sense mass to oscillate in parallel and in anti-phase in response to the Coriolis force, and wherein the plurality of sense coupling links cause a second sense mass and the fourth sense mass to oscillate in parallel and anti-phase in response to the Coriolis force, and wherein the oscillations of the first sense mass and the third sense mass are perpendicular to the oscillations of the second sense mass and the fourth sense mass.

An exemplary gyroscope may comprise four drive masses, wherein each of the four drive masses oscillate in a first plane, wherein a first drive mass is located adjacent to a second drive mass and a fourth drive mass, and opposite a third drive mass, wherein the second drive mass is located adjacent to the first drive mass and the third drive mass, and opposite the fourth drive mass, wherein the third drive mass is located adjacent to the second drive mass and the fourth drive mass, and opposite the first drive mass, and wherein the fourth drive mass is located adjacent to the third drive mass and the first drive mass, and opposite the second drive mass. The gyroscope may comprise a plurality of drive coupling links, wherein the plurality of drive coupling links prevent the four drive masses from moving in response to a linear acceleration or angular acceleration. The gyroscope may comprise four sense masses, wherein each of the four sense masses is associated with one of the four drive masses, wherein each of the four sense masses moves in a sense axis in response to a Coriolis force caused by the rotation of the gyroscope, and wherein the sense axis for each of the four sense masses is perpendicular to the oscillation of the associated drive mass and the axis of rotation of the gyroscope. The gyroscope may also comprise a plurality of sense coupling links, wherein the plurality of sense coupling links prevent the four sense masses from moving in response to a linear acceleration or angular acceleration.

BRIEF DESCRIPTION OF THE DRAWINGS

The above and other features of the present disclosure, its nature and various advantages will be more apparent upon consideration of the following detailed description, taken in conjunction with the accompanying drawings in which.

DETAILED DESCRIPTION

A gyroscope may be a yaw-rate gyroscope with a configuration that is robust to linear acceleration and angular acceleration. A drive motion of the drive masses of the gyroscope may be balanced and the drive masses may be coupled in a manner that prevents linear acceleration or angular acceleration from impacting the drive motion of the drive masses. Sense masses may be coupled to the drive masses in a manner such that the sense motion of the sense masses is balanced. The sense masses may also be coupled to each other in a manner that prevents linear acceleration or angular acceleration from impacting the sense motion of the sense masses.

An exemplary configuration of drive masses may include four drive masses arranged such that each drive mass is adjacent to two other drive masses and opposite the fourth drive mass. Each drive mass may oscillate in a manner that is perpendicular to its adjacent drive masses and in parallel and anti-phase to its opposite mass. This drive motion may cause the masses to alternatively move towards a first set of corner points or quadrants and a second set of corner points or quadrants. The sense masses may move in a similar manner.

Figure 1:
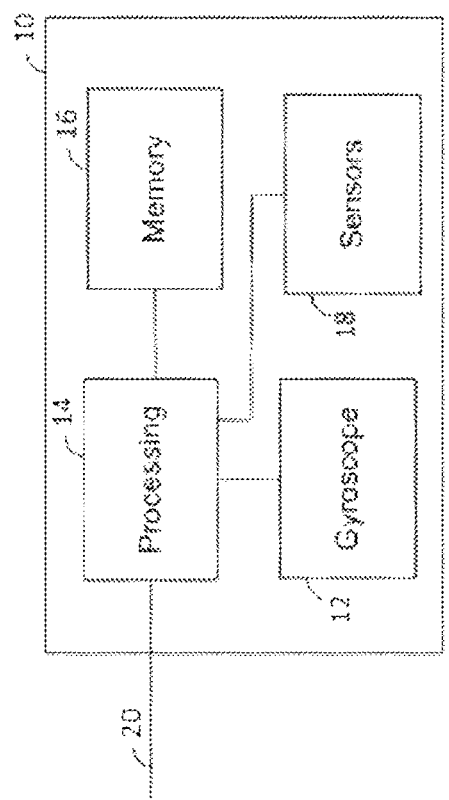
FIG. 1 shows an illustrative motion processing system in accordance with an embodiment of the present disclosure.

FIG. 1 depicts an exemplary motion processing system 10 in accordance with some embodiments of the present disclosure. Although particular components are depicted in FIG. 1, it will be understood that any suitable combination of sensors, processing components, memory, and other circuitry may be utilized as necessary for different applications and systems. In an embodiment as described herein, the motion processing system may include at least a MEMS gyroscope 12 and supporting circuitry, such as processing circuitry 14 and memory 16. In some embodiments, one or more additional sensors 18 (e.g., additional MEMS gyroscopes, MEMS accelerometers, MEMS microphones, MEMS pressure sensors, and a compass) may be included within the motion processing system 10 to provide an integrated motion processing unit ("MPU") (e.g., including 3 axes of MEMS gyroscope sensing, 3 axes of MEMS accelerometer sensing, microphone, pressure sensor, and compass).

Processing circuitry 14 may include one or more components providing necessary processing based on the requirements of the motion processing system 10. In some embodiments, processing circuitry 14 may include hardware control logic that may be integrated within a chip of a sensor (e.g., on a substrate or cap of a MEMS gyroscope, or on an adjacent portion of a chip to the gyroscope) such as the gyroscope 12 to control the operation of the gyroscope 12 and perform aspects of processing for the gyroscope 12. In some embodiments, the gyroscope 12 may include one or more registers that allow aspects of the operation of hardware control logic to be modified (e.g., by modifying a value of a register). Other sensors 18 may operate in a similar manner. In some embodiments, processing circuitry 14 may also include a processor such as a microprocessor that executes software instructions, e.g., that are stored in memory 16. The microprocessor may control the operation of the gyroscope 12 by interacting with the hardware control logic o2, and process measurement signals received from gyroscope 12. The microprocessor may interact with other sensors in a similar manner.

Although in some embodiments (not depicted in FIG. 1), the gyroscope 12 or other sensors 18 may communicate directly with external circuitry (e.g., via a serial bus or direct connection to sensor outputs and control inputs), in an embodiment the processing circuitry 14 may process data received from the gyroscope 12 and other sensors 18 and communicate with external components via a communication interface 20 (e.g., a SPI or I2C bus, or in automotive applications, a controller area network (CAN) or Local Interconnect Network (LIN) bus). The processing circuitry 14 may convert signals received from the gyroscope 12 and other sensors 18 into appropriate measurement units (e.g., based on settings provided by other computing units communicating over the communication bus 20) and perform more complex processing to determine measurements such as orientation or Euler angles, and in some embodiments, to determine from sensor data whether a particular activity (e.g., walking, running, braking, skidding, rolling, etc.) is taking place.

In some embodiments, certain types of information may be determined based on data from multiple gyroscopes 12 and sensors 18, in a process that may be referred to as sensor fusion. By combining information from a variety of sensors it may be possible to accurately determine information that is useful in a variety of applications, such as image stabilization, navigation systems, automotive controls and safety, dead reckoning, remote control and gaming devices, activity sensors, 3-dimensional cameras, industrial automation, and numerous other applications.

A MEMS gyroscope may typically have a plurality of micromechanical components that are used in order to measure rotation about an axis (e.g., pitch, roll, and/or yaw). The micromechanical components may include a plurality of masses, combs, electrodes, levers, arms, springs, and other similar components, situated in a device plane of the gyroscope. In some embodiments, the masses may be suspended in the device plane. One or more of the micromechanical components are caused to vibrate, typically through an electrostatic drive system such as drive electrodes or drive combs. The components (e.g., a drive mass) are caused to vibrate at a drive frequency in a drive axis. Although it may be possible to measure rotation from the drive mass, in many gyroscopes a number of masses (e.g., Coriolis masses, proof masses, sense masses, etc.) are coupled to each other by springs which often restrict the freedom of motion of the masses in certain directions based on the spring design and placement.

A mass that is vibrating in the drive axis may experience a force as a result of rotation of gyroscope about an axis. This Coriolis force is imparted on the mass along an axis (i.e., the sense axis) that is perpendicular to both the drive axis and the axis about which the gyroscope is rotating. When a mass (e.g., a sense mass) that experiences a Coriolis force is free to move in the sense axis (e.g., based on the configuration of the mass and springs), this sense mass will oscillate in the sense axis. In an exemplary yaw-rate MEMS gyroscope, masses are caused to oscillate in the first axis in response to the drive motion in that axis. A yaw rotation about an axis that is perpendicular to the device plane results in a Coriolis force in the device plane, and perpendicular to both the drive axis and the axis of rotation. The angular velocity of the gyroscope is measured based on the motion of the sense mass relative to a fixed sensor located in the device plane. In some embodiments, the sensing may be performed by electrodes such as combs or plates.

A device in which a gyroscope 12 is installed experiences a variety of types of forces along multiple axes. An exemplary yaw-rate gyroscope may experience forces such as linear accelerations in one or more directions, including within the drive plane of the gyroscope. Similarly, the exemplary yaw-rate gyroscope may also experience angular accelerations which may impact the motion of the drive and sense masses of the exemplary yaw-rate gyroscope, for example, based on a clockwise or counterclockwise rotation about the yaw rotational axis.

In an embodiment, the motion of the masses of an exemplary yaw-rate sensor may be balanced with respect to external linear accelerations and angular accelerations, such that the effects of the external accelerations and angular accelerations are not manifested in the movements of the sense masses. In exemplary embodiments the balance of the gyroscope design may be obtained based on a drive motion of the drive masses, coupling between the drive masses, coupling between the sense masses, or any suitable combination thereof.

Figure 2:
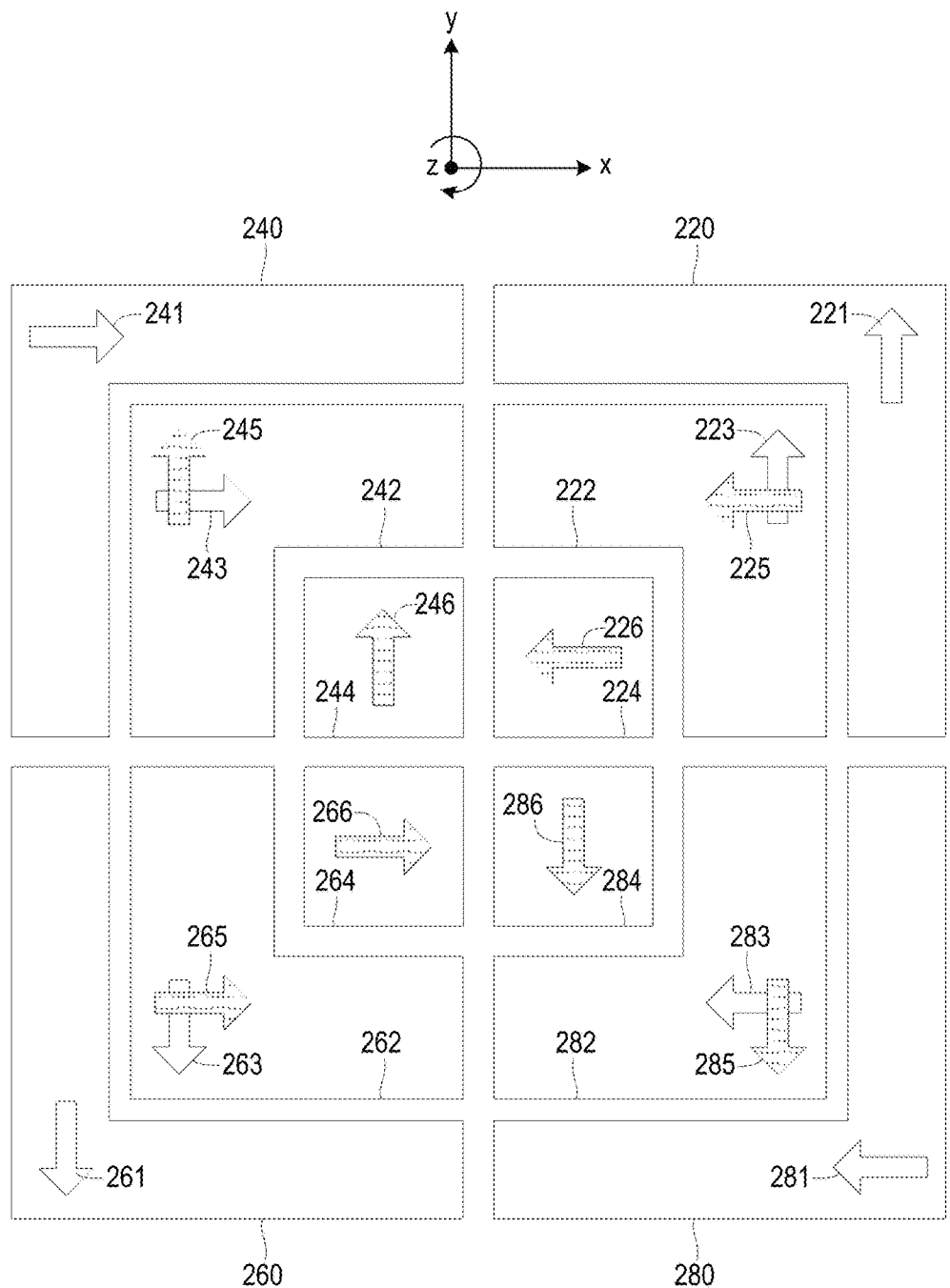
FIG. 2 shows an illustrative diagram depicting drive and sense motions of an exemplary gyroscope in accordance with an embodiment of the present disclosure.

FIG. 2 shows an illustrative diagram depicting drive and sense motions of an exemplary gyroscope in accordance with an embodiment of the present disclosure. Although the gyroscope of FIG. 2 may include any suitable components, in an exemplary embodiment the gyroscope of FIG. 2 may include drive masses 220, 240, 260, and 280; Coriolis masses 222, 242, 262, and 282; and sense masses 224, 244, 264, and 284. Each of these components may be located (e.g., suspended) within a device plane that defines an x-axis and y-axis in the plane, and a z-axis perpendicular to the plane. Although not depicted in the illustrative diagram of FIG. 2, a plurality of additional components such as springs, levers, drive electrodes, sense electrodes, anchors, and other similar components may be provided and configured to provide for the motion and operations described with respect to FIG. 2.

Each of the drive masses 220, 240, 260, and 280 may be caused to oscillate in a first axis based on a drive system including drive electrodes that drive one or more of the drive masses, and in some embodiments, components such as springs and levers that couple the drive masses to each other and cause certain relative motion of the drive masses with respect to each other. For each of the drive masses, the drive axis is depicted by a respective drive arrow, depicting a single direction of the oscillation of the respective drive mass associated with the respective drive. The drive arrows are depicted in a single direction for purposes of illustration only, and it will be understood that the drive system causes the masses to oscillate in both directions along each axis, and similarly, that the Coriolis response is also experienced in both directions along each axis for the Coriolis response.

In an embodiment, each of the drive masses may be located adjacent to two of the other drive masses in a manner such that it is coupled to the adjacent masses (e.g., by one or more springs, levers, arms, etc.) without any intervening masses (e.g., intervening drive masses, Coriolis masses, or sense masses). Each of the drive masses may also be located opposite to one of the other drive masses in a manner such that it is coupled to the opposite mass by intervening masses (e.g., intervening drive masses, Coriolis masses, or sense masses). The drive system may cause each mass to move perpendicular to its two adjacent drive masses and in parallel and in anti-phase to its opposite masses.

FIG. 2 depicts one direction of the drive motion for each of the drive masses (e.g., drive arrow 221 corresponds to drive mass 220, drive arrow 241 corresponds to drive mass 240, drive arrow 261 corresponds to drive mass 260, and drive arrow 281 corresponds to drive mass 280). As depicted in FIG. 2, when drive mass 220 moves in the positive y-direction according to drive arrow 221, the drive system causes drive mass 240 and drive mass 280 move perpendicular to the drive arrow 221 as depicted by drive arrow 241 in the positive x-direction and drive arrow 281 in the negative x-direction. The drive system causes the drive mass 260 to move in the opposite y-direction as from the drive mass 220, as depicted by drive arrow 261. When the drive system causes the drive masses to move in opposite directions, the drive mass 220 moves in the negative y-direction (i.e., opposite drive arrow 221), the drive mass 240 moves in the negative x-direction (i.e., opposite drive arrow 241), the drive mass 260 moves in the positive y-direction (i.e., opposite drive arrow 261), the drive mass 280 moves in the positive x-direction (i.e., opposite drive arrow 281).

When the drive masses move in the directions indicated by the drive arrows (i.e., drive arrows 221, 241, 261, and 281), the drive masses 220 and 240 both move in the direction of an upper-right (e.g., positive x-direction and positive y-direction) quadrant of the gyroscope, while the drive masses 260 and 280 both move in the direction of a lower-left (e.g., negative x-direction and negative y-direction) quadrant of the gyroscope. Similarly, when the drive masses move in the opposite direction from that indicated by the drive arrows (i.e., opposite from the direction of drive arrows 221, 241, 261, and 281), the drive masses 220 and 280 both move in the direction of a lower-right (e.g., positive x-direction and negative y-direction) quadrant of the gyroscope, while the drive masses 240 and 260 both move in the direction of an upper-left (e.g., negative x-direction and positive y-direction) quadrant of the gyroscope. As a result of this relative drive motion of each of the drive masses, the gyroscope is balanced in the presence of linear acceleration or angular accelerations.

In an embodiment, when the gyroscope experiences a linear acceleration in the positive x-direction, the drive masses would experience a displacement in the direction of this linear acceleration, e.g., drive mass 240 would experience a displacement consistent with its arrow and mass 280 would experience a displacement in the opposite direction of its arrow. However, movement in this manner is prohibited by the configuration of the masses, since when mass 240 moves in the positive x-direction mass 280 must move in the negative x-direction. Sense masses 224 and 264 function in a similar manner in response to x-direction linear accelerations, as do drive masses 220 and 260 and sense masses 244 and 284 in response to y-direction linear accelerations.

In an embodiment, when the gyroscope experiences an angular acceleration about the z-axis in a clockwise direction, the drive masses would attempt to move according to the momentum due to the acceleration, e.g., drive masses 240 and 280 would attempt to move consistently to their arrows and drive masses 220 and 260 would attempt to move in the opposite direction of their arrows. However, movement in this manner is prevented by configuration of the drive the masses, since one pair of drive masses (e.g., drive mass pair 240/280 or drive mass pair 220/260) will be prohibited from moving in response to the momentum due to angular acceleration. A similar balance is retained for rotation about the z-axis in the counterclockwise direction, and for the sense mass pairs 224/264 and 244/284.

The movement of the Coriolis masses (e.g., Coriolis masses 222, 242, 262, and 282) and sense masses (e.g., sense masses 224, 244, 264, and 284) will be described with respect to the drive direction as indicated by drive arrows 221, 241, 261, and 281. However, it will be understood that with an opposite direction drive motion the Coriolis forces imparted on each of the Coriolis masses 222, 242, 262, and 282 and sense masses 224, 244, 264, and 284 will cause each mass to move in an opposite direction to that depicted by the arrows of FIG. 2. Moreover, while the embodiment of FIG. 2 depicts Coriolis masses that are driven by drive masses, and that isolate the sense masses from the drive motion, in an embodiment the Coriolis masses may be omitted from the structure of FIG. 2 to permit the drive motion to drive the sense masses directly in the drive direction.

In an embodiment, each Coriolis mass may be associated with a drive mass, such that it oscillates in the drive axis of the associated drive mass (e.g., Coriolis mass 222 is associated with drive mass 220, Coriolis mass 242 is associated with drive mass 240, Coriolis mass 262 is associated with drive mass 260, and Coriolis mass 282 is associated with drive mass 280). Although the drive motion from the respective drive mass may be transferred to its associated Coriolis mass in any suitable manner, in an embodiment, a coupling link such as one or more springs may be rigid along the drive axis (i.e., the y-axis for Coriolis mass 222 and drive mass 220, the x-axis for Coriolis mass 242 and drive mass 240, the y-axis for Coriolis mass 262 and drive mass 260, and the x-axis for Coriolis mass 282 and drive mass 280). In order for the Coriolis mass to move in response to a Coriolis force that is in plane and perpendicular to the drive force, each coupling link such as one or more springs may be flexible along this perpendicular axis (i.e., the x-axis for Coriolis mass 222 and drive mass 220, the y-axis for Coriolis mass 242 and drive mass 240, the x-axis for Coriolis mass 262 and drive mass 260, and the y-axis for Coriolis mass 282 and drive mass 280).

FIG. 2 depicts an exemplary embodiment of a clockwise yaw rotation about the z-axis. In response to the drive force imparted on each Coriolis mass, the Coriolis mass moves in a respective drive direction, depicted as Coriolis drive arrow 223 for Coriolis mass 222, Coriolis drive arrow 243 for Coriolis mass 242, Coriolis drive arrow 263 for Coriolis mass 262, and Coriolis drive arrow 283 for Coriolis mass 282. As a result of the clockwise rotation about z-axis, each Coriolis mass experiences a Coriolis force in the device plane that is proportional to the angular velocity of the yaw rotation, in a direction that is perpendicular to both the drive axis and the axis of rotation. This is depicted as Coriolis arrow 225 for Coriolis mass 222, Coriolis arrow 245 for Coriolis mass 242, Coriolis arrow 265 for Coriolis mass 262, and Coriolis arrow 285 for Coriolis mass 282. The motion of the Coriolis masses in response to the yaw rotation is balanced in a similar manner to the drive masses, with the Coriolis masses 222 and 242 both moving in the direction of an upper-left (e.g., negative x-direction and positive y-direction) quadrant of the gyroscope, and with the Coriolis masses 262 and 282 both moving in the direction of a lower-right (e.g., positive x-direction and negative y-direction) quadrant of the gyroscope in response to the Coriolis forces (e.g., as permitted by the flexible coupling between the drive masses and Coriolis masses in these directions). In a similar manner, when the drive masses are oscillating in the opposite direction, the Coriolis masses 222 and 282 both move in the direction of an upper-right (e.g., positive x-direction and positive y-direction) quadrant of the gyroscope, while the Coriolis masses 242 and 262 both move in the direction of a lower-left (e.g., negative x-direction and negative y-direction) quadrant of the gyroscope.

In an embodiment, each sense mass 224, 244, 264, and 284 may be associated with a respective Coriolis mass 222, 242, 262, or 282 in a manner such that the drive motion of Coriolis mass is not transferred to the sense mass, but the motion of the Coriolis mass in response to the Coriolis force is transferred to the sense mass. In an embodiment, sense mass 224 may be coupled to the Coriolis mass 222 by a coupling link (e.g., one or more springs) that is rigid in the x-axis and flexible in the y-axis, sense mass 244 may be coupled to the Coriolis mass 242 by a coupling link that is rigid in the y-axis and flexible in the x-axis, sense mass 264 may be coupled to the Coriolis mass 262 by a coupling link that is rigid in the x-axis and flexible in the y-axis, and sense mass 284 may be coupled to the Coriolis mass 282 by a coupling link that is rigid in the y-axis and flexible in the x-axis. Thus, the sense masses 224, 244, 264, and 284 may experience Coriolis forces as depicted by sense arrows 226, 246, 266, and 286, respectively. The movement of the sense mass may be sensed using electrodes, sense combs, or other techniques, for example, fixed in the device plane and at locations relative to the sense masses. The motion of the sense masses in response to the yaw rotation is balanced in a similar manner to the drive and Coriolis masses, with the sense masses 224 and 244 both moving in the direction of an upper-left (e.g., negative x-direction and positive y-direction) quadrant of the gyroscope and with the sense masses 264 and 284 both moving in the direction of a lower-right (e.g., positive x-direction and negative y-direction) quadrant of the gyroscope in response to the Coriolis forces (e.g., as transferred to the sense masses by the rigid direction of the coupling links with the Coriolis masses). In a similar manner, when the drive and Coriolis masses are oscillating in the opposite direction, the sense masses 224 and 284 both move in the direction of an upper-right (e.g., positive x-direction and positive y-direction) quadrant of the gyroscope, while the sense masses 244 and 264 both move in the direction of a lower-left (e.g., negative x-direction and negative y-direction) quadrant of the gyroscope.

Figure 3:
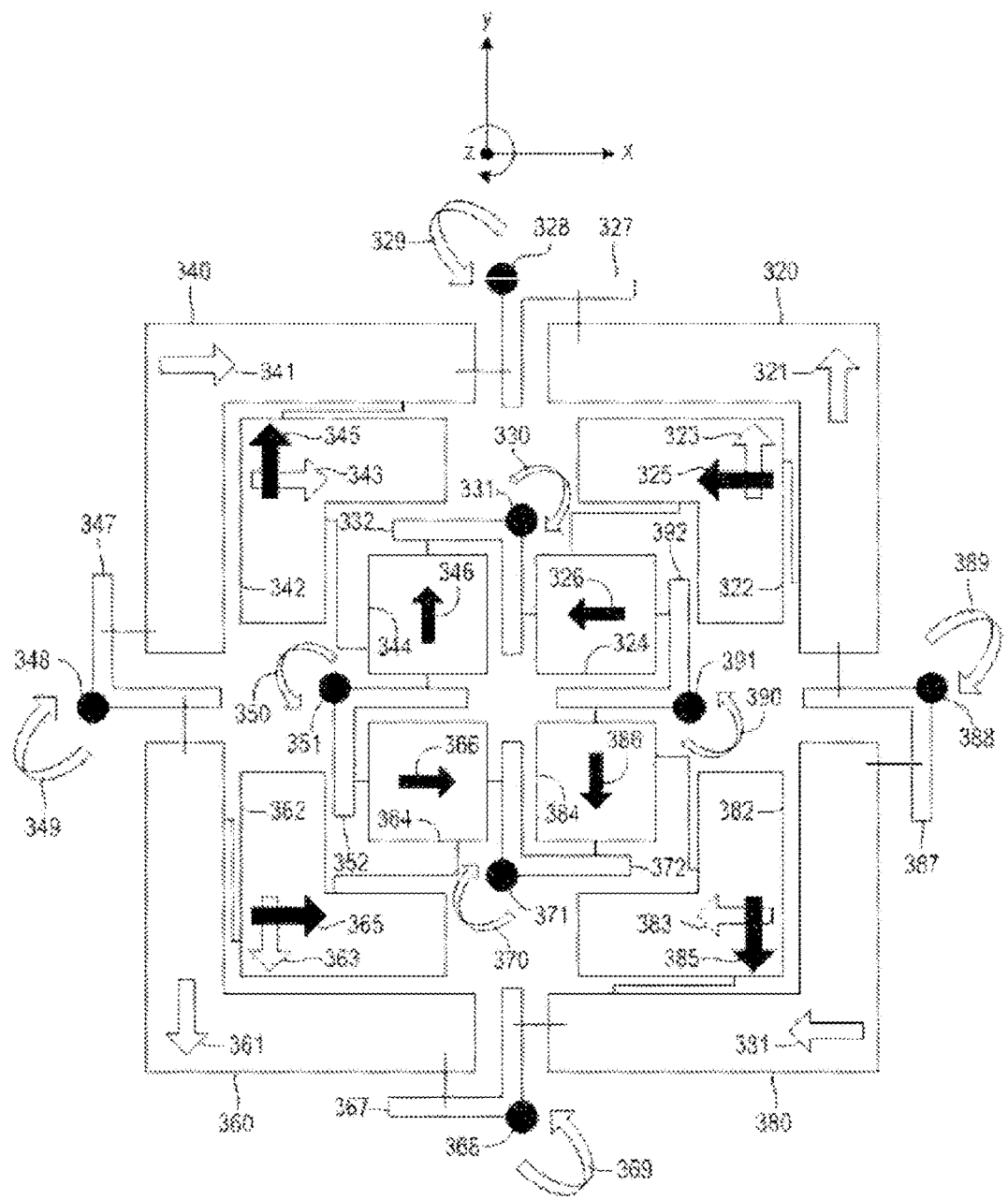
FIG. 3 shows an illustrative schematic depicting drive and sense motions of an exemplary gyroscope in accordance with an embodiment of the present disclosure.

FIG. 3 shows an illustrative schematic depicting drive and sense motions of an exemplary gyroscope in accordance with an embodiment of the present disclosure. In an embodiment, the gyroscope depicted in FIG. 3 may generally correspond to the gyroscope depicted in FIG. 2, such that drive masses 320, 340, 360, and 380 correspond to drive masses 220, 240, 260, and 280; Coriolis masses 322, 342, 362, and 382 correspond to Coriolis masses 222, 242, 262, and 282; sense masses 324, 344, 364, and 384 correspond to sense masses 224, 244, 264, and 284; drive arrows 321, 341, 361, and 381 correspond to drive arrows 221, 241, 261, and 281; Coriolis drive arrows 323, 343, 363, and 383 correspond to drive arrows 223, 243, 263, and 283; Coriolis arrows 325, 345, 365, and 385 correspond to drive arrows 225, 245, 265, and 285; and sense arrows 326, 346, 366, and 386 correspond to sense arrows 226, 246, 266, and 286.

Although any suitable components may be used to provide coupling link between the drive, sense, and Coriolis masses, in an embodiment as depicted in FIG. 3 sets of levers and springs may provide for the coupling links between the masses. It will be understood that the levers and springs depicted and described in FIG. 3, and that other configurations may enable the same relative motions between the various coupled masses. Moreover, it will be understood that additional coupling link components may be provided in addition to the coupling link components depicted in FIG. 3.

In an exemplary embodiment, each drive mass may be coupled to each of its two adjacent drive masses by two springs (not numbered in FIG. 3) and a drive lever, such that drive mass 320 is coupled to drive mass 340 by two springs and drive lever 327, such that drive mass 340 is coupled to drive mass 360 by two springs and drive lever 347, such that drive mass 360 is coupled to drive mass 380 by two springs and drive lever 367, and such that drive mass 380 is coupled to drive mass 320 by two springs and drive lever 387. Each of the drive levers is anchored to the substrate by a respective anchor 328, 348, 368, or 388, and pivots about that anchor. Each of the springs connecting the drive masses to the anchors is rigid in the direction of the desired drive motion and flexible in the other direction. Thus, the orientation of the drive levers relative to the drive masses, the orientation of the springs, the attachment points of the springs to the drive masses and drive levers, and the location of the anchoring points collectively restrict the respective movement of the drive masses to the balanced drive motion as described herein.

In an embodiment of movement in the directions depicted by drive arrows 321, 341, 361, and 381, each of the drive levers 327, 347, 367, and 387 pivot around respective anchors 328, 348, 368, and 388 as depicted by pivot arrows 329, 349, 369, and 389. For example, the spring attaching drive mass 320 to drive lever 327 is rigid along the y-axis, and the motion of the drive mass in the y-direction will push or pull the drive lever 327 about the anchor 328. In the embodiment depicted in FIG. 3, a movement of the drive mass 320 in the positive y-direction as shown by drive arrow 321 will push the drive lever 327 about anchor 328 as depicted by pivot arrow 329, causing the drive lever 327 to pull drive mass 340 in the positive x-direction as depicted by drive arrow 341. A movement of the drive mass 340 in the positive x-direction as shown drive arrow 341 will also push the drive lever 327 about anchor 328 as depicted by pivot arrow 329, causing the drive lever 327 to pull drive mass 320 in the positive y-direction as depicted by drive arrow 321. In a similar manner, any motion along the drive axis of any drive mass may cause a corresponding motion of its two adjacent drive masses in their drive directions, based on their connections by the drive levers. In this manner, the drive levers restrict the movement of the drive masses to the balanced drive motion, and reduce the motion of the drive masses caused by linear or angular acceleration.

Each of the drive masses is coupled to its respective Coriolis mass by a spring that is rigid in the drive direction and flexible in the Coriolis/sense direction. In this manner, the drive force of the respective drive masses (e.g., drive masses 320, 340, 360, and 380) in the direction of the drive arrows (e.g., drive arrow 321, 341, 361, and 381) causes the attached Coriolis mass (e.g., Coriolis masses 322, 342, 362, and 382) to move in the direction of the Coriolis drive arrows (e.g., Coriolis drive arrows 323, 343, 363, 383). In the exemplary embodiment of a rotation in the clockwise direction about the z-axis, each Coriolis mass (e.g., Coriolis masses 322, 342, 362, and 382) will move in the direction of its Coriolis arrow (e.g., Coriolis arrow 325, 345, 365, and 385). Similarly, it will be understood that in response to a drive motion in the opposite direction depicted by the drive arrows and Coriolis drive arrows of FIG. 3, a Coriolis force due to the clockwise rotation about the z-axis will act on the Coriolis masses in the opposite direction in response to a Coriolis force. It will also be understood that with the drive motion of FIG. 3, a Coriolis force due to a counter-clockwise rotation about the z-axis will act on the Coriolis masses in the opposite direction in response to a Coriolis force.

The Coriolis force on each of the Coriolis masses is transferred to its associated sense mass by springs that are rigid along the axis of the Coriolis force (e.g., the x-axis for Coriolis mass 322 and sense mass 324, the y-axis for Coriolis mass 342 and sense mass 344, the x-axis for Coriolis mass 362 and sense mass 364, and the x-axis for Coriolis mass 382 and sense mass 384) and flexible along the other axis of the x-axis or y-axis. In an embodiment of a drive direction and clockwise rotation about the z-axis as depicted in FIG. 3, this will cause sense mass 324 to move in the direction of sense arrow 326, sense mass 344 to move in the direction of sense arrow 346, sense mass 364 to move in the direction of sense arrow 366, and sense mass 384 to move in the direction of sense arrow 386. These sense motions can be sensed, e.g., by fixed sense electrodes anchored to a substrate of the gyroscope (not depicted in FIG. 3).

In an exemplary embodiment, each sense mass may be coupled to each of its two adjacent sense masses by two springs (not numbered in FIG. 3) and a sense lever, such that sense mass 324 is coupled to sense mass 344 by two springs and sense lever 332, such that sense mass 344 is coupled to sense mass 364 by two springs and sense lever 352, such that sense mass 364 is coupled to sense mass 384 by two springs and sense lever 372, and such that sense mass 384 is coupled to sense mass 324 by two springs and sense lever 392. Each of the sense levers is anchored to the substrate by a respective anchor 331, 351, 371, or 391, and pivots about that anchor. Each of the springs connecting the sense masses to the anchors is rigid in the direction of the desired sense motion and flexible in the other direction. Thus, the orientation of the sense levers relative to the sense masses, the orientation of the springs, the attachment points of the springs to the sense masses and sense levers, and the location of the anchoring points collectively restrict the respective movement of the sense masses to the balanced sense motion as described herein.

In an embodiment of movement in the directions depicted by sense arrows 326, 346, 366, and 386, each of the sense levers 332, 352, 372, and 392 pivot around respective anchors 331, 351, 371, and 391 as depicted by pivot arrows 330, 350, 370, and 390. For example, the spring attaching sense mass 324 to sense lever 332 is rigid along the x-axis, and the motion of the sense mass in the x-direction will push or pull the sense lever 332 about the anchor 331. In the embodiment depicted in FIG. 3, a movement of the sense mass 324 in the negative x-direction as shown by sense arrow 326 will push the sense lever 332 about anchor 331 as depicted by pivot arrow 330, causing the sense lever 332 to pull sense mass 344 in the positive y-direction as depicted by sense arrow 346. A movement of the sense mass 344 in the positive y-direction as shown by sense arrow 346 will also push the sense lever 332 about anchor 331 as depicted by pivot arrow 330, causing the sense lever 332 to pull sense mass 324 in the negative x-direction as depicted by sense arrow 326. In a similar manner, any motion along the sense axis of any sense mass may cause a corresponding motion of its two adjacent sense masses in their sense directions, based on their connections by the sense levers. In this manner, the sense levers restrict the movement of the sense masses to the balanced sense motion, and reduce the motion of the sense masses caused by linear or angular acceleration.

Figure 4:
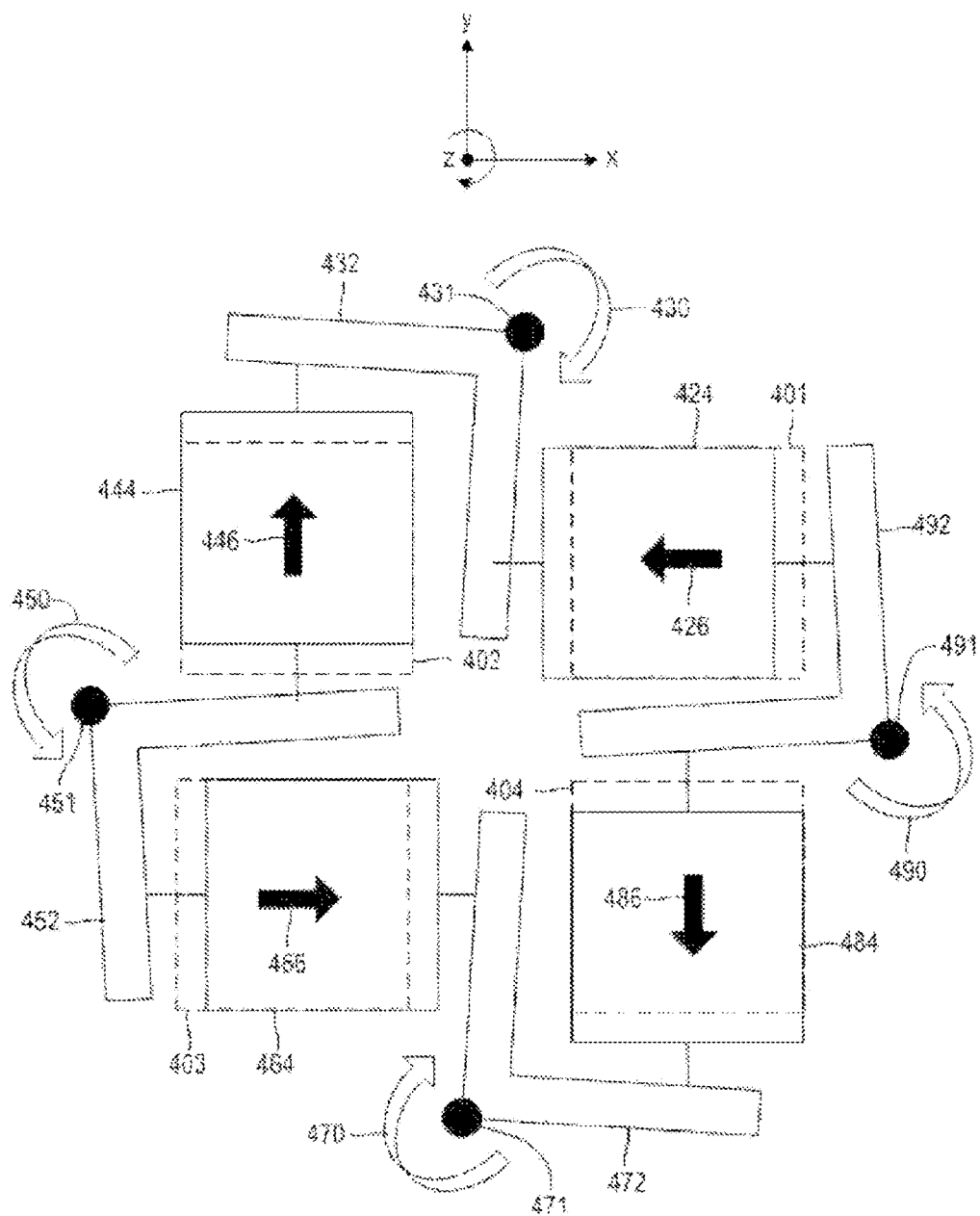
FIG. 4 shows an illustrative diagram depicting pivotal motion of exemplary sense masses in accordance with an embodiment of the present disclosure.

FIG. 4 shows an illustrative diagram depicting pivotal motion of exemplary sense masses in accordance with an embodiment of the present disclosure. The components and sense motion depicted in FIG. 4 correspond to the components and sense motion depicted in FIG. 3, e.g., such that sense mass 424 corresponds to sense mass 324, sense arrow 426 corresponds to sense arrow 326, etc. An original location of each of the sense masses without any rotation is depicted by original location 401 for sense mass 424, original location 402 for sense mass 444, original location 403 for sense mass 464, and original location 404 for sense mass 484.

In the absence of rotation about the z-axis, the sense masses will remain in their respective original locations, as any displacement caused by a linear acceleration or angular acceleration on the sense masses will be canceled out by relative motion of the sense masses to each other, as required by the sense levers. For example, any displacements due to linear acceleration along the x-axis will be canceled out by the opposing forces that will be created in the sense mass system by the sense masses 424 and 464. In an exemplary embodiment of a linear acceleration that causes the sense mass 424 to move in the positive x-direction, the sense mass 424 would attempt to pull sense mass 484 in the positive y-direction and push sense mass 444 in the negative y-direction. These forces will be counteracted by sense mass 464, which will attempt to pull sense mass 484 in the negative y-direction and push sense mass 444 in the positive y-direction. Similarly, displacements caused by linear acceleration in other directions or angular accelerations will be counteracted by the opposing forces of the sense mass configuration.

FIG. 4 depicts the movement of the sense masses and sense levers in response to a Coriolis force, e.g., in response to the rotation and drive direction depicted in FIG. 3. Each of the sense masses (e.g., sense mass 424, 444, 464, and 484) has a Coriolis force imparted on it in the direction of the sense arrows (e.g., sense arrows 426, 446, 466, and 486). The sense levers (e.g., sense levers 432, 452, 472, and 492) are pushed and pulled by the respective sense masses (e.g., sense masses 424 and 444 for sense lever 432, sense masses 444 and 464 for sense lever 452, sense masses 464 and 484 for sense lever 472, and sense masses 484 and 424 for sense lever 492) such that the sense levers pivot about anchors as depicted by the pivot arrows (e.g., pivot arrow 430 depicting sense lever 432 pivoting about anchor 431, pivot arrow 450 depicting sense lever 452 pivoting about anchor 451, pivot arrow 470 depicting sense lever 472 pivoting about anchor 471, and pivot arrow 490 depicting sense lever 492 pivoting about anchor 491). Thus, the sense levers facilitate the sense motion of the sense masses due to angular velocity while preventing motion due to linear acceleration and angular acceleration.

Figure 5:
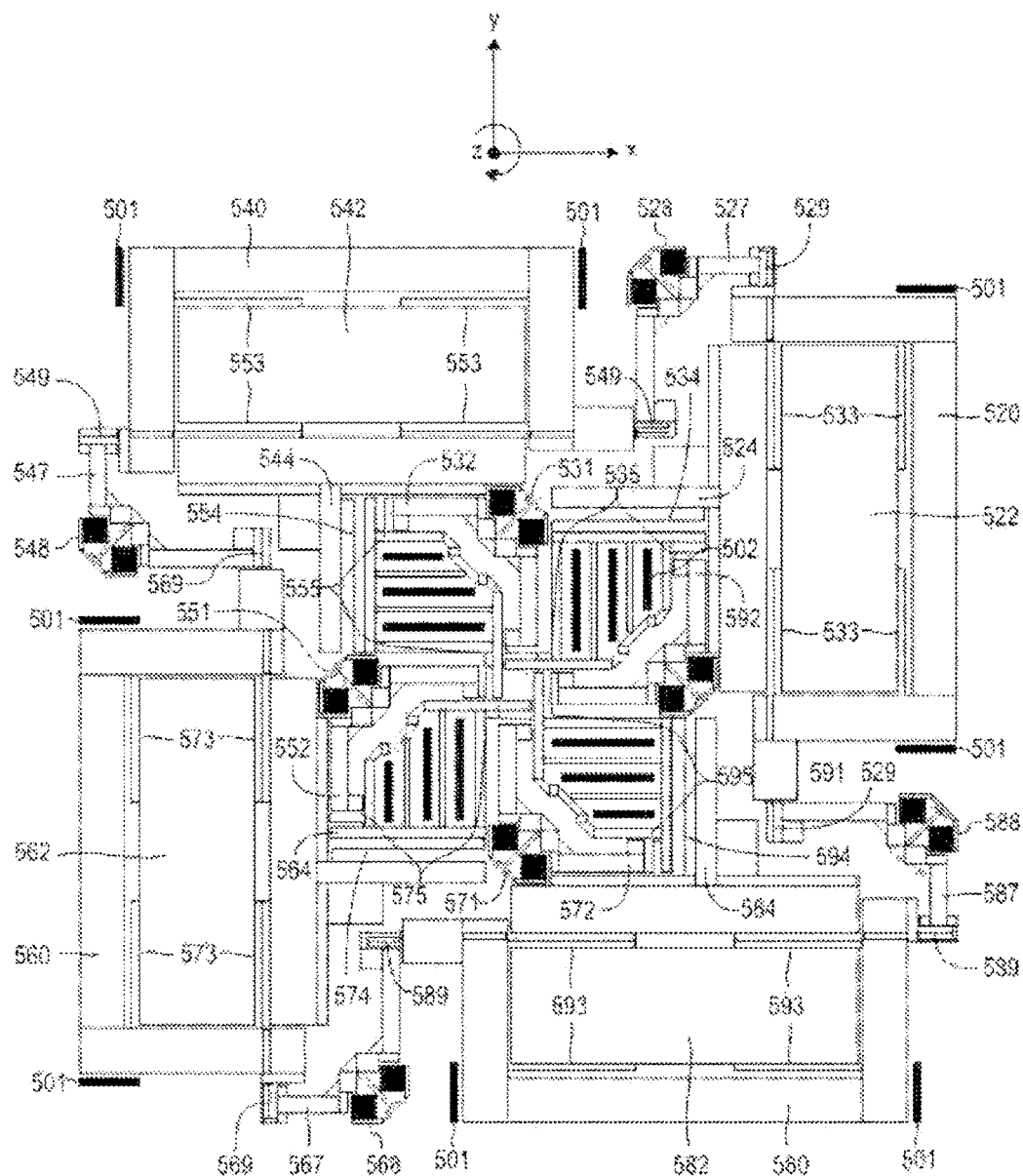
FIG. 5 shows an exemplary gyroscope design having an architecture that is robust to undesired forces in accordance with some embodiments of the present disclosure.

FIG. 5 shows an exemplary gyroscope design having an architecture that is robust to undesired forces in accordance with some embodiments of the present disclosure. The components depicted in FIG. 5 correspond to the components and sense motion depicted in FIG. 3, e.g., such that drive mass 520 corresponds to drive mass 320, Coriolis mass 522 corresponds to Coriolis mass 322, sense mass 524 corresponds to sense mass 324, drive lever 527 corresponds to drive lever 327, sense lever 532 corresponds to sense lever 332, etc. Although the drive arrows, Coriolis drive arrows, Coriolis arrows, and sense arrows are not depicted in FIG. 5, the drive, Coriolis, and sense motions of the gyroscope of FIG. 5 operate in the manner depicted in FIG. 3. Moreover, additional components such as drive electrodes 501, sense electrodes 502, and springs are depicted or numbered in FIG. 5.

In an embodiment, fixed drive electrodes 501 located in the device plane cause the drive masses to move in the drive direction (e.g., to cause drive mass 520 to oscillate in the y-axis, to cause drive mass 540 to oscillate in the x-axis, to cause drive mass 560 to oscillate in the y-axis in anti-phase to drive mass 520, and to cause drive mass 580 to oscillate in the x-axis in anti-phase to drive mass 540). Drive electrodes 501 may be implemented in any suitable manner, such as drive combs, and may be located at any suitable location to drive the drive masses (e.g., within a cavity at the interior of a drive mass). Drive sense electrodes (not depicted) may sense the drive response, and in some embodiments, drive electrodes may be positioned to drive fewer than all of the drive masses, with the drive motion being transferred to the other drive masses by the drive levers.

In some embodiments, each drive mass is coupled to its two adjacent drive masses by two drive springs and a drive lever. The drive springs are rigid in the drive axis of their respective drive mass and are flexible in the perpendicular direction (e.g., drive coupling springs 529 of drive mass 520 are rigid in the y-axis, drive coupling springs 549 of drive mass 540 are rigid in the x-axis, drive coupling springs 569 of drive mass 560 are rigid in the y-axis, and drive coupling springs 589 of drive mass 580 are rigid in the x-axis). Each drive lever is coupled to two drive masses by respective drive coupling springs and is anchored in a manner that allows the drive lever to pivot in response to the drive motion. Thus, drive lever 527 may pivot about anchor 528, drive lever 547 may pivot about anchor 548, drive lever 567 may pivot about anchor 568, and drive lever 587 may pivot about anchor 588.

Each drive mass may be coupled to an associated Coriolis mass by springs that are rigid in the drive axis and flexible in the Coriolis axis. In an embodiment, drive springs 533 connecting drive mass 520 to Coriolis mass 522 are rigid in the y-axis and flexible in the x-axis, drive springs 553 connecting drive mass 540 to Coriolis mass 542 are rigid in the x-axis and flexible in the y-axis, drive springs 573 connecting drive mass 560 to Coriolis mass 562 are rigid in the y-axis and flexible in the x-axis, and drive springs 593 connecting drive mass 580 to Coriolis mass 582 are rigid in the x-axis and flexible in the y-axis.

Each Coriolis mass may be coupled to an associated sense mass by springs that are rigid in the Coriolis axis and flexible in the drive axis, such that a Coriolis force is transmitted to the sense mass but a drive force is not. In an embodiment, Coriolis spring 534 connecting Coriolis mass 522 to sense mass 524 is rigid in the x-axis and flexible in the y-axis, Coriolis spring 554 connecting Coriolis mass 542 to sense mass 544 is rigid in the y-axis and flexible in the x-axis, Coriolis spring 574 connecting Coriolis mass 562 to sense mass 564 is rigid in the x-axis and flexible in the y-axis, and Coriolis spring 594 connecting Coriolis mass 582 to sense mass 584 is rigid in the y-axis and flexible in the x-axis.

Although sense electrodes may be implemented in any suitable manner (e.g., as sense combs), in an embodiment sense electrodes 502 may be located at fixed locations within cavities of the sense masses and in the device plane. As the sense masses move along their sense directions, each sense mass and its sense electrodes effectively form capacitors which may be used to measure the movement of the sense masses, which is proportional to the angular velocity.

In some embodiments, each sense mass is coupled to its two adjacent sense masses by two sense coupling springs and a sense lever. The sense coupling springs are rigid in the sense axis of their respective sense mass and are flexible in the perpendicular direction (e.g., sense coupling springs 535 of sense mass 524 are rigid in the x-axis, sense coupling springs 555 of sense mass 544 are rigid in the y-axis, sense coupling springs 575 of sense mass 564 are rigid in the x-axis, and sense coupling springs 595 of sense mass 584 are rigid in the y-axis). Each sense lever is coupled to two sense masses by respective sense coupling springs and is anchored in a manner that allows the sense lever to pivot in response to the sense motion. Thus, sense lever 532 may pivot about anchor 531, sense lever 552 may pivot about anchor 551, sense lever 572 may pivot about anchor 571, and sense lever 592 may pivot about anchor 591.

Figure 6:
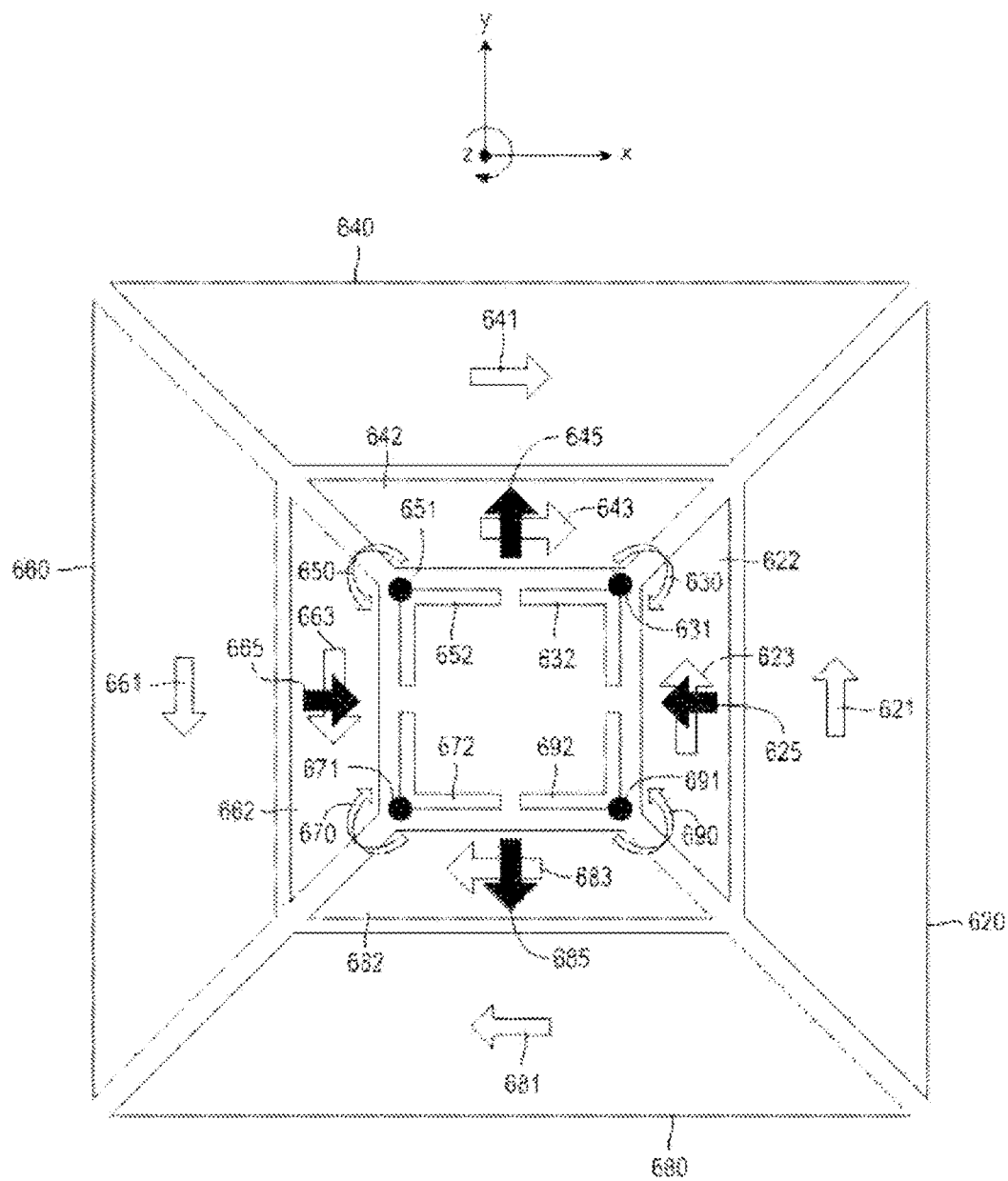
FIG. 6 shows an illustrative diagram depicting drive and sense motions of an exemplary gyroscope in accordance with an embodiment of the present disclosure.

FIG. 6 shows an illustrative diagram depicting drive and sense motions of another exemplary gyroscope in accordance with an embodiment of the present disclosure. Although the gyroscope of FIG. 6 may include any suitable components, in an exemplary embodiment the gyroscope of FIG. 6 may include drive masses 620, 640, 660, and 680; sense masses 622, 642, 662, and 682; and sense levers 632, 652, 672, and 692. Each of these components may be located (e.g., suspended) within a device plane that defines an x-axis and y-axis in the plane, and a z-axis perpendicular to the plane. As depicted in FIG. 6, anchors 631, 651, 671 and 691 may be connected to sense levers 632, 652, 672, and 692 in the plane of the gyroscope. Although not depicted in the illustrative diagram of FIG. 6, a plurality of additional components such as springs, levers, drive electrodes, sense electrodes, anchors, and other similar components may be provided and configured to provide for the motion and operations described with respect to FIG. 6.

Each of the drive masses 620, 640, 660, and 680 may be caused to oscillate in a first axis based on a drive system including drive electrodes that drive one or more of the drive masses, and in some embodiments, components such as springs and levers that couple the drive masses to each other and cause certain relative motion of the drive masses with respect to each other. For each of the drive masses, the drive axis is depicted by a respective drive arrow, depicting a single direction of the oscillation of the respective drive mass associated with the respective drive. The drive arrows are depicted in a single direction for purposes of illustration only, and it will be understood that the drive system causes the masses to oscillate in both directions along each axis, and similarly, that the Coriolis response is also experienced in both directions along each axis for the Coriolis response.

In an embodiment, each of the drive masses may be located adjacent to two of the other drive masses in a manner such that it is coupled to the adjacent masses (e.g., by one or more springs, levers, arms, etc.) without any intervening masses (e.g., intervening drive masses, Coriolis masses, or sense masses). Each of the drive masses may also be located opposite to one of the other drive masses in a manner such that it is coupled to the opposite mass by intervening masses (e.g., intervening drive masses, Coriolis masses, or sense masses). The drive system may cause each mass to move perpendicular to its two adjacent drive masses and in parallel and in anti-phase to its opposite masses. In an embodiment, corner coupling springs may support common movement of each set of adjacent masses toward a common quadrant or corner point, while permitting movement away from each other toward an opposite quadrant or corner. This may facilitate a balanced drive of the drive masses in a manner that prevents forces due to linear acceleration and angular acceleration from being coupled to the drive motion.

FIG. 6 depicts one direction of the drive motion for each of the drive masses (e.g., drive arrow 621 corresponds to drive mass 620, drive arrow 641 corresponds to drive mass 640, drive arrow 661 corresponds to drive mass 660, and drive arrow 681 corresponds to drive mass 680). As depicted in FIG. 6, when drive mass 620 moves in the positive y-direction according to drive arrow 621, the drive system causes drive mass 640 and drive mass 680 move perpendicular to the drive arrow 621 as depicted by drive arrow 641 in the positive x-direction and drive arrow 681 in the negative x-direction. The drive system causes the drive mass 660 to move in the opposite y-direction as from the drive mass 620, as depicted by drive arrow 661. When the drive system causes the drive masses to move in opposite directions, the drive mass 620 moves in the negative y-direction (i.e., opposite drive arrow 621), the drive mass 640 moves in the negative x-direction (i.e., opposite drive arrow 641), the drive mass 660 moves in the positive y-direction (i.e., opposite drive arrow 661), the drive mass 680 moves in the positive x-direction (i.e., opposite drive arrow 681).

When the drive masses move in the directions indicated by the drive arrows (i.e., drive arrows 621, 641, 261, and 681), the drive masses 620 and 640 both move in the direction of an upper-right (e.g., positive x-direction and positive y-direction) quadrant of the gyroscope, while the drive masses 660 and 680 both move in the direction of a lower-left (e.g., negative x-direction and negative y-direction) quadrant of the gyroscope. Similarly, when the drive masses move in the opposite direction from that indicated by the drive arrows (i.e., opposite from the direction of drive arrows 621, 641, 661, and 681), the drive masses 620 and 680 both move in the direction of a lower-right (e.g., positive x-direction and negative y-direction) quadrant of the gyroscope, while the drive masses 640 and 660 both move in the direction of an upper-left (e.g., negative x-direction and positive y-direction) quadrant of the gyroscope. As a result of this relative drive motion of each of the drive masses, the gyroscope is balanced in the presence of linear acceleration or angular accelerations.

In an embodiment, when the gyroscope experiences a linear acceleration in the positive x-direction, the drive masses would experience a displacement in the direction of this linear acceleration, e.g., drive mass 640 would experience a displacement consistent with its arrow 641 and mass 680 would experience a displacement in the opposite direction of its arrow 681. However, movement in this manner is prohibited by the configuration of the masses, since when mass 640 moves in the positive x-direction mass 680 must move in the negative x-direction. The drive masses 620 and 660 respond in a similar manner in response to y-direction linear accelerations. The sense masses 622, 642, 662, and 682 similarly are restricted from responding to linear acceleration in the x-direction or y-direction.

In an embodiment, when the gyroscope experiences an angular acceleration about the z-axis in a clockwise direction, the drive masses would attempt to move according to the momentum due to the acceleration, e.g., drive masses 640 and 680 would attempt to move consistently to their arrows and drive masses 620 and 660 would attempt to move in the opposite direction of their arrows. However, movement in this manner is prevented by configuration of the drive the masses configuration, since one pair of drive masses (e.g., drive mass pair 640/680 or drive mass pair 620/660) will be prohibited from moving in response to the momentum due to angular acceleration. A similar balance is retained for rotation about the z-axis in the counterclockwise direction, and for the sense mass pairs 624/664 and 644/684.

The movement of the sense masses 622, 642, 662, and 682 will be described with respect to the drive direction as indicated by drive arrows 621, 641, 661, and 681. However, it will be understood that with an opposite direction drive motion the Coriolis forces imparted on each of the sense masses 622, 642, 662, and 682 will cause each sense mass to move in an opposite direction to that depicted by the arrows of FIG. 6. Moreover, while the embodiment of FIG. 6 depicts sense masses that are coupled to the drive masses without an intervening mass, in an embodiment, Coriolis masses may be driven by drive masses, and isolate the sense masses from the drive motion.

In an embodiment, each sense mass may be associated with a drive mass, such that it oscillates in the drive axis of the associated drive mass (e.g., sense mass 622 is associated with drive mass 620, sense mass 642 is associated with drive mass 640, sense mass 662 is associated with drive mass 660, and sense mass 682 is associated with drive mass 680). Although the drive motion from the respective drive mass may be transferred to its associated sense mass in any suitable manner, in an embodiment, a coupling link such as one or more springs may be rigid along the drive axis (i.e., the y-axis for sense mass 622 and drive mass 620, the x-axis for sense mass 642 and drive mass 640, the y-axis for sense mass 662 and drive mass 660, and the x-axis for Coriolis mass 682 and drive mass 680). In order for the sense mass to move in response to a Coriolis force that is in plane and perpendicular to the drive force, each coupling link such as one or more springs may be flexible along this perpendicular axis (i.e., the x-axis for sense mass 622 and drive mass 620, the y-axis for sense mass 642 and drive mass 640, the x-axis for sense mass 662 and drive mass 660, and the y-axis for Coriolis mass 682 and drive mass 680).

FIG. 6 depicts an exemplary embodiment of a clockwise yaw rotation about the z-axis. In response to the drive force imparted on each sense mass, the sense mass moves in a respective drive direction, depicted as sense drive arrow 623 for sense mass 622, sense drive arrow 643 for sense mass 642, sense drive arrow 663 for sense mass 662, and sense drive arrow 683 for sense mass 682. As a result of the clockwise rotation about z-axis, each sense mass experiences a Coriolis force in the device plane that is proportional to the angular velocity of the yaw rotation, in a direction that is perpendicular to both the drive axis and the axis of rotation. This is depicted as sense arrow 625 for sense mass 622, sense arrow 645 for sense mass 642, sense arrow 665 for sense mass 662, and sense arrow 685 for sense mass 682. The motion of the Coriolis masses in response to the yaw rotation is balanced in a similar manner to the drive masses, with the sense masses 622 and 662 both moving towards a common center point of the gyroscope, and with the sense masses 642 and 682 both moving away from a common center point of the gyroscope. In a similar manner, when the drive masses are oscillating in the opposite direction, the sense masses 622 and 662 both move away from the common center point of the gyroscope, while the sense masses 642 and 682 both move towards the common center point of the gyroscope. The movement of the sense mass may be sensed using electrodes, sense combs, or other techniques, for example, fixed in the device plane and at locations relative to the sense masses.

Although not depicted in FIG. 6, in some embodiments each drive mass may be coupled to each of its two adjacent drive masses, e.g., by a drive lever, such that drive mass 620 is coupled to drive mass 640 by a drive coupling, such that drive mass 640 is coupled to drive mass 660 by a drive coupling, such that drive mass 660 is coupled to drive mass 680 by a drive coupling, and such that drive mass 680 is coupled to drive mass 620 by a drive coupling. Each of the drive levers is anchored to the substrate by a respective anchor and pivots about that anchor. Each of the springs connecting the drive masses to the anchors is rigid in the direction of the desired drive motion and flexible in the other direction. Thus, the orientation of the drive levers relative to the drive masses, the orientation of the springs, the attachment points of the springs to the drive masses and drive levers, and the location of the anchoring points collectively restrict the respective movement of the drive masses to the balanced drive motion as described herein.

In an exemplary embodiment, sense levers may be located within an interior cavity of the gyroscope relative to the sense masses, and each sense mass may be coupled to each of its two adjacent sense masses by a sense lever. Sense mass 622 is coupled to sense mass 642 by sense lever 632, sense mass 642 is coupled to sense mass 662 by sense lever 652, sense mass 662 is coupled to sense mass 682 by sense lever 672, and sense mass 682 is coupled to sense mass 622 by sense lever 692. Each of the sense levers is anchored to the substrate by a respective anchor 631, 651, 671, or 691, and pivots about that anchor. In some embodiments, springs may attach the sense masses to the anchors, and may be rigid in the direction of the desired sense motion and flexible in the other direction. Thus, the orientation of the sense levers relative to the sense masses, the orientation of the springs, the attachment points of the springs to the sense masses and sense levers, and the location of the anchoring points collectively restrict the respective movement of the sense masses to the balanced sense motion as described herein.

In an embodiment of movement in the directions depicted by sense arrows 625, 645, 665, and 685, each of the sense levers 632, 652, 672, and 692 pivot around respective anchors 631, 651, 671, and 691 as depicted by pivot arrows 630, 650, 670, and 690. For example, the motion of the sense mass 622 in the x-direction will push or pull the sense lever 632 about the anchor 631. In the embodiment depicted in FIG. 6, a movement of the sense mass 622 in the negative x-direction as shown by sense arrow 625 will push the sense lever 632 about anchor 631 as depicted by pivot arrow 630, causing the sense lever 632 to push sense mass 642 in the positive y-direction as depicted by sense arrow 645. A movement of the sense mass 642 in the positive y-direction as shown by sense arrow 645 will also pull the sense lever 632 about anchor 631 as depicted by pivot arrow 630, causing the sense lever 632 to pull sense mass 622 in the negative x-direction as depicted by sense arrow 625. In a similar manner, any motion along the sense axis of any sense mass cause a corresponding motion of its two adjacent sense masses in their sense directions, based on their connections by the sense levers. In this manner, the sense levers restrict the movement of the sense masses to the balanced sense motion, and reduce the motion of the sense masses caused by linear or angular acceleration.

Figure 7:
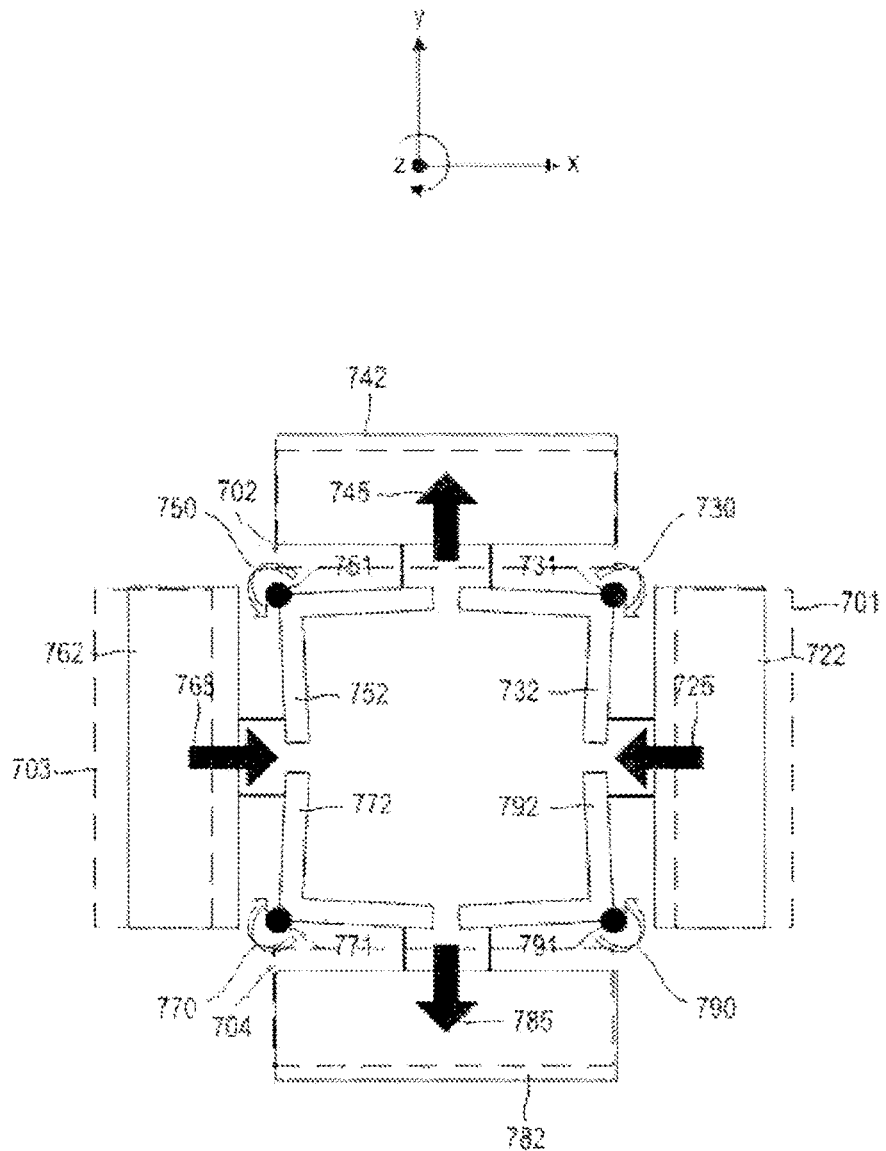
FIG. 7 shows an illustrative diagram depicting pivotal motion of exemplary sense masses in accordance with an embodiment of the present disclosure.

FIG. 7 shows an illustrative diagram depicting pivotal motion of exemplary sense masses in accordance with an embodiment of the present disclosure. The components and sense motion depicted in FIG. 7 correspond to the components and sense motion depicted in FIG. 6, e.g., such that sense mass 722 corresponds to sense mass 622, sense arrow 725 corresponds to sense arrow 625, etc. An original location of each of the sense masses without any rotation is depicted by original location 701 for sense mass 722, original location 702 for sense mass 742, original location 703 for sense mass 762, and original location 704 for sense mass 782.

In the absence of rotation about the z-axis, the sense masses will remain in their respective original locations, as any displacements due by a linear acceleration or angular acceleration on the sense masses will be canceled out by relative motion of the sense masses to each other, as required by the sense levers. For example, any forces due to linear acceleration along the x-axis will be canceled out by the opposing forces that will be created in the sense mass system by the sense masses 722 and 762. In an exemplary embodiment of a linear acceleration that causes the sense mass 772 to move in the positive x-direction, the sense mass 722 would attempt pull sense mass 782 in the positive y-direction and pull sense mass 742 in the negative y-direction. These forces will be counteracted by sense mass 762, which will attempt to push sense mass 782 in the negative y-direction and push sense mass 742 in the positive y-direction. Similarly, displacements caused by linear acceleration in other directions or angular accelerations will be counteracted by the opposing forces of the sense mass configuration.

FIG. 7 depicts the movement of the sense masses and sense levers in response to a Coriolis force, e.g., in response to the rotation and drive direction depicted in FIG. 6. Each of the sense masses (e.g., sense mass 722, 742, 762, and 782) has a Coriolis force imparted on it in the direction of the sense arrows (e.g., sense arrows 725, 745, 765, and 785). The sense levers (e.g., sense levers 732, 752, 772, and 792) are pushed and pulled by the respective sense masses (e.g., sense masses 722 and 742 for sense lever 732, sense masses 742 and 762 for sense lever 752, sense masses 762 and 782 for sense lever 772, and sense masses 782 and 722 for sense lever 792) such that the sense levers pivot about anchors as depicted by the pivot arrows (e.g., pivot arrow 730 depicting sense lever 732 pivoting about anchor 731, pivot arrow 750 depicting sense lever 752 pivoting about anchor 751, pivot arrow 770 depicting sense lever 772 pivoting about anchor 771, and pivot arrow 790 depicting sense lever 792 pivoting about anchor 791). Thus, the sense levers facilitate the sense motion of the sense masses due to angular velocity while preventing motion due to linear acceleration and angular acceleration.

Figure 8:
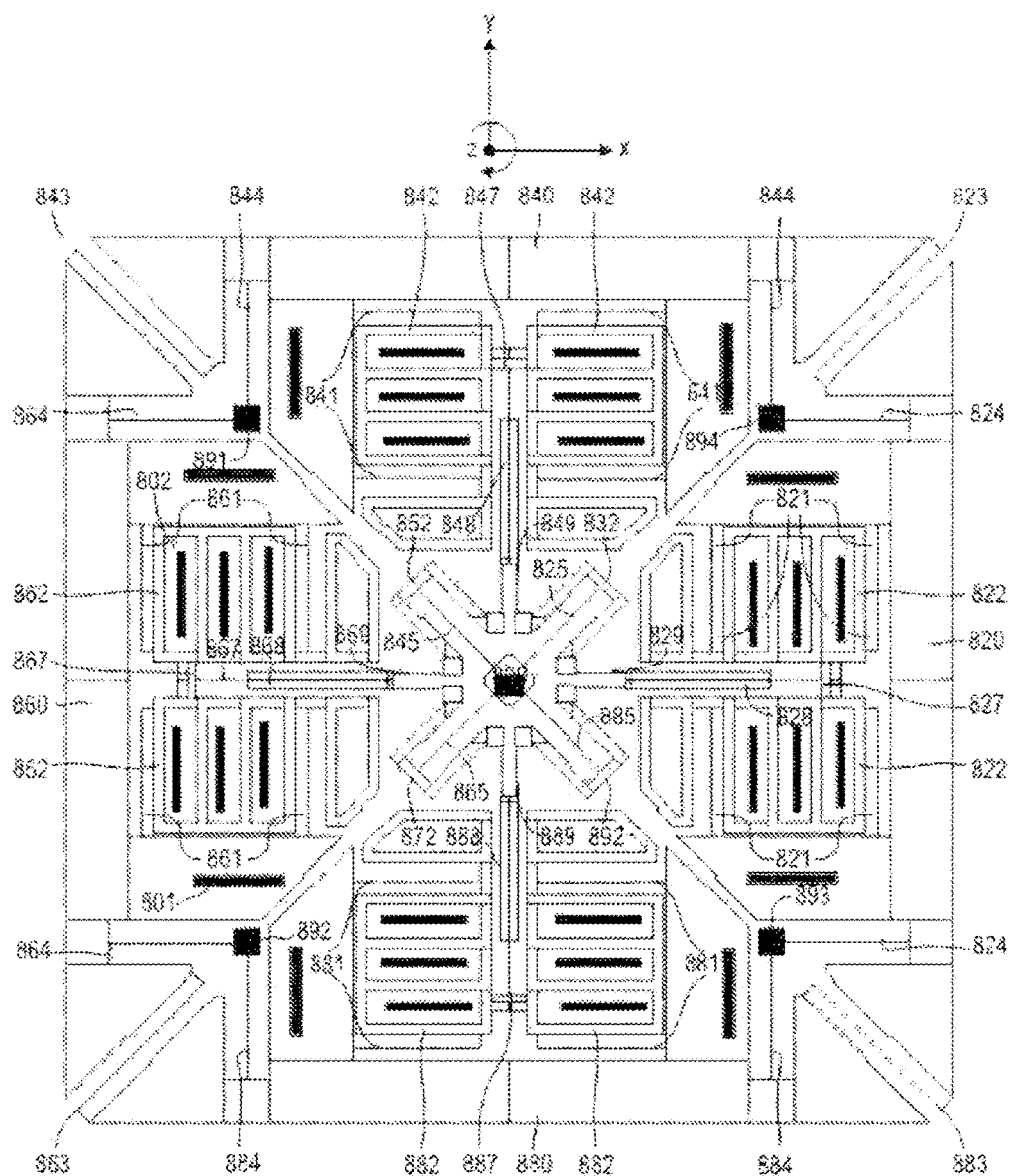
FIG. 8 shows an exemplary gyroscope design having an architecture that is robust to undesired forces in accordance with some embodiments of the present disclosure.

FIG. 8 shows an exemplary gyroscope design having an architecture that is robust to undesired forces in accordance with some embodiments of the present disclosure. The components depicted in FIG. 8 correspond to the components and sense motion depicted in FIG. 6, e.g., such that drive mass 820 corresponds to drive mass 620, sense mass 822 corresponds to sense mass 622, sense lever 832 corresponds to sense lever 632, etc. Although the drive arrows, sense drive arrows, and sense arrows are not depicted in FIG. 8, the drive and sense motions of the gyroscope of FIG. 8 operate in the manner depicted in FIG. 6. Moreover, additional components such as drive electrodes 801, sense electrodes 802, and springs are depicted or numbered in FIG. 8.

In an embodiment, fixed drive electrodes 801 located in the device plane cause the drive masses to move in the drive direction (e.g., to cause drive mass 820 to oscillate in the y-axis, to cause drive mass 840 to oscillate in the x-axis, to cause drive mass 860 to oscillate in the y-axis in anti-phase to drive mass 820, and to cause drive mass 880 to oscillate in the x-axis in anti-phase to drive mass 840). Drive electrodes 801 may be implemented in any suitable manner, such as drive combs, and may be located at any suitable location to drive the drive masses (e.g., external to the drive masses). Drive sense electrodes (not depicted) may sense the drive response, and in some embodiments, drive electrodes may be positioned to drive fewer than all of the drive masses, with the drive motion being transferred to the other drive masses by the couplings between the drive masses.

In an embodiment, each drive mass may be coupled to two drive anchors by drive anchor springs. The drive anchor springs may be flexible in the drive axis of the drive mass and rigid in the axis perpendicular to the drive axis. In the rigid direction, the drive anchor springs may be coupled on one end to a drive anchor and on the other end to the drive mass. As is depicted in FIG. 8, drive mass 820 is coupled to drive anchors 894 and 893 by drive anchor springs 824 in a manner that prevents movement of drive mass 820 along the x-axis, drive mass 840 is coupled to drive anchors 894 and 891 by drive anchor springs 844 in a manner that prevents movement of drive mass 840 along the y-axis, drive mass 860 is coupled to drive anchors 891 and 892 by drive anchor springs 864 in a manner that prevents movement of drive mass 860 along the x-axis, and drive mass 880 is coupled to drive anchors 892 and 893 by drive anchor springs 884 in a manner that prevents movement of drive mass 880 along the y-axis.

In some embodiments, each drive mass is coupled to each of its two adjacent drive masses by a corner coupling spring. The corner coupling springs are configured to support movement of the drive masses toward a common corner or quadrant but to be flexible when two drive masses are moving away from each other towards another corner or quadrant. In an embodiment, as depicted in FIG. 8, each corner coupling spring 823, 843, 863, and 883 may be rigid at a 45 degree angle that directs motion of the adjacent masses towards and away from a corner point or quadrant, and flexible at a perpendicular angle that permits movement of the adjacent masses towards corner points and adjacent quadrants. In an embodiment, when combined with the restriction of the drive masses from moving perpendicular to their drive axis (e.g., by drive anchor springs), the motion of one drive mass towards its corner point may also result in the movement of the adjacent drive mass towards the common corner point. As described herein, any linear acceleration or angular acceleration will result in counteracting forces that prevent coupling of the external force to the drive motion.

In an embodiment as depicted in FIG. 8, corner coupling spring 823 may be rigid at a 45 degree angle from the positive y-axis, in a manner such that a drive motion of drive mass 820 in the positive y-direction or drive mass 840 in the positive x-direction will cause the other of adjacent drive masses 820 and 840 to move toward an upper-right quadrant or corner. When the two drive masses 820 and 840 are driven in opposite directions the corner coupling spring 823 is compliant such that drive mass 820 may move toward the lower-right quadrant or corner, and drive mass 840 may move toward the upper-left quadrant or corner. Each of the other corner coupling springs may be appropriately attached and oriented relative to the drive masses (e.g., corner coupling spring 843 rigid at a 315 degree angle from the positive y-axis and coupled to drive mass 840 and drive mass 860, corner coupling spring 863 rigid at a 225 degree angle from the positive y-axis and coupled to drive mass 860 and drive mass 880, and corner coupling spring 883 rigid at a 135 degree angle from the positive y-axis and coupled to drive mass 880 and drive mass 820) to facilitate the balanced motion of the gyroscope.

Each drive mass may be coupled to an associated sense mass by drive springs that are rigid in the drive axis and flexible in the sense axis. In an embodiment, drive springs 821 connecting drive mass 820 to sense mass 822 are rigid in the y-axis and flexible in the x-axis, drive springs 841 connecting drive mass 840 to sense mass 842 are rigid in the x-axis and flexible in the y-axis, drive springs 861 connecting drive mass 860 to sense mass 862 are rigid in the y-axis and flexible in the x-axis, and drive springs 881 connecting drive mass 880 to sense mass 882 are rigid in the x-axis and flexible in the y-axis.

As described herein, each sense mass may move in response to a Coriolis caused by rotation about the yaw axis of the gyroscope, and angular velocity may be sensed based on these movements, e.g., by sense electrodes. Although sense electrodes may be implemented in any suitable manner (e.g., as sense combs), in an embodiment sense electrodes 802 may be located at fixed locations within cavities of the sense masses and in the device plane. As the sense masses move along their sense directions, each sense mass and its sense electrodes effectively form capacitors which may be used to measure the movement of the sense masses, which is proportional to the angular velocity.

In some embodiments, each sense mass is coupled to its two adjacent sense masses by two sense coupling links and a sense lever. In an embodiment, the sense coupling links may include a plurality of sense coupling springs and a sense coupling bar which are rigid in the sense axis of their respective sense mass and are flexible in the perpendicular direction (e.g., sense coupling springs 827 and 829 and sense coupling bar 828 of sense mass 822 are rigid in the x-axis, sense coupling springs 847 and 849 and sense coupling bar 848 of sense mass 842 are rigid in the y-axis, sense coupling springs 867 and 869 and sense coupling bar 868 of sense mass 862 are rigid in the x-axis, and sense coupling springs 887 and 889 and sense coupling bar 888 of sense mass 882 are rigid in the y-axis). Each sense lever is coupled to two sense masses by respective sense coupling springs and sense coupling bars and is anchored to sense anchor 899 in a manner that allows the sense lever to pivot in response to the sense motion (e.g., sense lever 832 is coupled to sense anchor 899 by sense anchoring spring 825, sense lever 852 is coupled to sense anchor 899 by sense anchoring spring 845, sense lever 872 is coupled to sense anchor 899 by sense anchoring spring 865, and sense lever 892 is coupled to sense anchor 899 by sense anchoring spring 885.

In an embodiment, when sense masses 822 and 862 move in anti-phase towards the center of the gyroscope, the configuration of the sense levers will cause sense lever 832 to pivot in a clockwise direction and sense lever 852 to pivot in a counterclockwise direction, causing sense mass 842 to move in the positive y-direction. In a similar manner, sense lever 872 will pivot in a clockwise direction and sense lever 892 will pivot in a counterclockwise direction, causing sense mass 882 to move in the negative y-direction. When sense masses 822 and 862 move in anti-phase away the center of the gyroscope, the configuration of the sense levers will cause sense lever 832 to pivot in a counterclockwise direction and sense lever 852 to pivot in a clockwise direction, causing sense mass 842 to move in the negative y-direction. Sense lever 872 will pivot in a counterclockwise direction and sense lever 892 will pivot in a clockwise direction, causing sense mass 882 to move in the positive y-direction. The sense masses 822 and 862 will respond to y-axis movement of the sense masses 842 and 882 in a similar manner.

If forces are imparted upon the sense masses in a manner that does not conform to the proper sense motion (e.g., as a result of linear acceleration or angular acceleration), the sense masses will be restricted from movement as a result of counteracting forces caused by the configuration of the sense masses and sense levers. In an exemplary embodiment of a linear acceleration that causes sense masses 842 and 882 to move in the positive y-direction, both of sense masses 842 and 882 will attempt to move in the positive y-direction. Sense mass 842 will attempt to cause sense lever 852 to pivot in a counterclockwise direction and to cause sense lever 832 to pivot in a clockwise direction, while sense mass 882 will attempt to cause sense lever 872 to pivot in a counterclockwise direction and to cause sense lever 892 to pivot in a clockwise direction. The forces imparted upon the sense mass 862 by the counterclockwise rotation of the sense levers 852 and 872 will counteract each other, and the forces imparted upon the sense mass 822 by the clockwise rotation of the sense levers 832 and 892 will counteract each other. This will prevent the sense levers from rotating, and because the sense coupling springs (e.g., sense coupling springs 847, 849, 887, and 889) and sense coupling bars (e.g., sense coupling bars 848 and 888) are rigid in the y-axis, the sense masses 842 and 882 will also be prevented from moving.

The foregoing description includes exemplary embodiments in accordance with the present disclosure. These examples are provided for purposes of illustration only, and not for purposes of limitation. It will be understood that the present disclosure may be implemented in forms different from those explicitly described and depicted herein and that various modifications, optimizations, and variations may be implemented by a person of ordinary skill in the present art, consistent with the following claims.

It will be understood that the configurations of masses, springs, levers, anchors, electrodes, and similar components are exemplary only and that various configurations from multiple figures may be combined in suitable manners, e.g., such as by switching the sense lever configuration of FIGS. 3-5 with the sense lever configuration of FIGS. 6-8 and vice versa, including or omitting Coriolis masses within any environment, utilizing multiple springs or other coupling methods, including drive levers with the embodiment of FIGS. 6-8 or omitting drive levers in the embodiment of FIGS. 3-5, or by any other suitable modification, addition, removal, optimization, or variation as may be implemented by a person having ordinary skill in the art or as is described herein.

What is claimed is:

1. A gyroscope, comprising:
   four drive masses, wherein each of the four drive masses oscillate in a first plane, wherein a first drive mass is located adjacent to a second drive mass and a fourth drive mass, and opposite a third drive mass, wherein the second drive mass is located adjacent to the first drive mass and the third drive mass, and opposite the fourth drive mass, wherein the third drive mass is located adjacent to the second drive mass and the fourth drive mass, and opposite the first drive mass, and wherein the fourth drive mass is located adjacent to the third drive mass and the first drive mass and opposite the second drive mass;
   one or more drive electrodes, wherein the one or more drive electrodes cause the first drive mass and the third drive mass to oscillate along parallel axes and in anti-phase, and wherein the one or more drive electrodes cause the second drive mass and the fourth drive mass to oscillate along parallel axes and anti-phase, and wherein the oscillations of the first drive mass and the third drive mass are perpendicular to the oscillations of the second drive mass and the fourth drive mass;
   four sense masses, wherein each of the four sense masses is associated with a respective one of the four drive masses, wherein each of the four sense masses moves in a sense axis in response to a Coriolis force caused by the rotation of the gyroscope, and wherein the sense axis for each of the four sense masses is in the first plane and perpendicular to the oscillation of the associated drive mass and the axis of rotation of the gyroscope; and
   a plurality of sense coupling links, wherein each of the sense masses is pivotally coupled to two of the other sense masses by one or more of the plurality of sense coupling links, wherein the plurality of sense coupling links comprise four coupling links, wherein a first coupling link pivotally couples the first sense mass to the second sense mass, wherein a second coupling link pivotally couples the second sense mass to the third sense mass, wherein a third coupling link pivotally couples the third sense mass to a fourth sense mass, and wherein a fourth coupling link pivotally couples the fourth sense mass to the first sense mass.

2. The gyroscope of claim 1, wherein the first and the second drive mass move towards and away from a first point, wherein the second and the third drive mass move towards and away from a second point, wherein the third and the fourth drive mass move towards and away from a third point, and wherein the fourth and the first drive mass move towards and away from a fourth point.

3. The gyroscope of claim 2, wherein the first and the second drive mass move towards the first point when the third and the fourth drive mass move towards the third point, and wherein the fourth and the first drive mass move towards the fourth point when the second and the third drive mass move towards the second point.

4. The gyroscope of claim 1, wherein the gyroscope is balanced with respect to linear acceleration and angular acceleration.

5. The gyroscope of claim 1, wherein the four sense coupling links cause the first sense mass and the third sense mass to move in parallel and in anti-phase, cause the second sense mass and fourth sense mass to move in parallel and in anti-phase, and cause the first sense mass and the third sense mass move perpendicular to the second sense mass and the fourth sense mass.

6. The gyroscope of claim 1, wherein the four sense coupling links cause the first sense mass and the third sense mass to simultaneously move towards or away from a center point of the gyroscope in response to the Coriolis force, cause the second sense mass and the fourth sense mass to simultaneously move towards or away from the center point of the gyroscope the Coriolis force, and wherein the first sense mass and third sense mass move along an opposite axis relative to the center point of the gyroscope than the second sense mass and the fourth sense mass.

7. The gyroscope of claim 1, further comprising four drive coupling links, wherein a first drive coupling link couples the first drive mass to the second drive mass, a second drive coupling link couples the second drive mass to the third drive mass, a third drive coupling link couples the third drive mass to the fourth drive mass, and wherein a fourth coupling link couples the fourth drive mass to the first drive mass.

8. The gyroscope of claim 7, wherein each of the four drive coupling links comprises a drive lever to pivotally couple the respective drive masses to each other.

9. The gyroscope of claim 1, further comprising:
   a first Coriolis mass coupled to the first drive mass and the first sense mass;
   a second Coriolis mass coupled to the second drive mass and the second sense mass;
   a third Coriolis mass coupled to the third drive mass and the third sense mass; and
   a fourth Coriolis mass coupled to the fourth drive mass and the fourth sense mass.

10. The gyroscope of claim 9, further comprising:
    a first drive spring coupling the first Coriolis mass to the first drive mass, wherein the first drive spring is rigid in the axis of the oscillation of the first drive mass and flexible in the axis of the Coriolis force of the first sense mass;
    a first sense spring coupling the first Coriolis mass to the first sense mass, wherein the first sense spring is rigid in the axis of the Coriolis force of the first sense mass;
    a second drive spring coupling the second Coriolis mass to the second drive mass, wherein the second drive spring is rigid in the axis of the oscillation of the second drive mass and flexible in the axis of the Coriolis force of the second sense mass;
    a second sense spring coupling the second Coriolis mass to the second sense mass, wherein the second sense spring is rigid in the axis of the Coriolis force of the second sense mass;
    a third drive spring coupling the third Coriolis mass to the third drive mass, wherein the third drive spring is rigid in the axis of the oscillation of the third drive mass and flexible in the axis of the Coriolis force of the third sense mass;

a third sense spring coupling the third Coriolis mass to the third sense mass, wherein the third sense spring is rigid in the axis of the Coriolis force of the third sense mass;

a fourth drive spring coupling the fourth Coriolis mass to the fourth drive mass, wherein the fourth drive spring is rigid in the axis of the oscillation of the fourth drive mass and flexible in the axis of the Coriolis force of the fourth sense mass; and a fourth sense spring coupling the fourth Coriolis mass to the fourth sense mass, wherein the fourth sense spring is rigid in the axis of the Coriolis force of the fourth sense mass.

11. The gyroscope of claim 10, wherein the first sense spring is flexible in the axis of the drive force of the first drive mass, wherein the second sense spring is flexible in the axis of the drive force of the second drive mass, wherein the third sense spring is flexible in the axis of the drive force of the third drive mass, and wherein the fourth sense spring is flexible in the axis of the drive force of the fourth drive mass.

12. The gyroscope of claim 1, further comprising:

a first drive spring coupling the first drive mass to the first sense mass, wherein the first drive spring is rigid in the axis of the oscillation of the first drive mass and flexible in the axis of the Coriolis force of the first sense mass;

a second drive spring coupling the second drive mass to the second sense mass, wherein the second drive spring is rigid in the axis of the oscillation of the second drive mass and flexible in the axis of the Coriolis force of the second sense mass;

a third drive spring coupling the third drive mass to the third sense mass, wherein the third drive spring is rigid in the axis of the oscillation of the third drive mass and flexible in the axis of the Coriolis force of the third sense mass; and a fourth drive spring coupling the fourth drive mass to the fourth sense mass, wherein the fourth drive spring is rigid in the axis of the oscillation of the fourth drive mass and flexible in the axis of the Coriolis force of the fourth sense mass.

* * * * *